United States Patent
Yamamoto

(10) Patent No.: US 12,032,861 B2
(45) Date of Patent: Jul. 9, 2024

(54) PRINTING SYSTEM, SERVER, CONTROL METHOD, AND STORAGE MEDIUM FOR CONTROLLING A PRINTER

(71) Applicant: CANON KABUSHIKI KAISHA, Tokyo (JP)

(72) Inventor: Hiroyuki Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/148,895

(22) Filed: Dec. 30, 2022

(65) Prior Publication Data

US 2023/0214159 A1 Jul. 6, 2023

(30) Foreign Application Priority Data

Jan. 6, 2022 (JP) .................. 2022-000970

(51) Int. Cl.
*G06F 3/12* (2006.01)

(52) U.S. Cl.
CPC ............ *G06F 3/1204* (2013.01); *G06F 3/121* (2013.01); *G06F 3/1267* (2013.01); *G06F 3/1268* (2013.01)

(58) Field of Classification Search
None
See application file for complete search history.

(56) References Cited

U.S. PATENT DOCUMENTS

| | | | | |
|---|---|---|---|---|
| 8,687,208 B2* | 4/2014 | Nakatsuka | ............ | G06F 3/1273 358/1.14 |
| 2007/0201091 A1* | 8/2007 | Tanaka | .................. | G06F 3/1258 358/1.16 |
| 2011/0170137 A1* | 7/2011 | Tanaka | .................. | G06F 3/1258 358/1.15 |
| 2012/0092711 A1* | 4/2012 | Hosoda | ................... | G06F 3/122 358/1.15 |
| 2012/0327463 A1* | 12/2012 | Mizuno | ................. | G06F 3/1288 358/1.15 |
| 2013/0120774 A1* | 5/2013 | Kouguchi | ............ | G06K 15/188 358/1.9 |
| 2013/0301068 A1* | 11/2013 | Yamada | ............. | H04N 1/32358 358/1.13 |
| 2013/0321841 A1* | 12/2013 | Nakajima | .......... | H04N 1/00474 358/1.14 |
| 2019/0258431 A1* | 8/2019 | Yamamoto | ............ | G06F 3/1268 |

FOREIGN PATENT DOCUMENTS

JP 2014153891 A 8/2014

* cited by examiner

*Primary Examiner* — Dung D Tran
(74) *Attorney, Agent, or Firm* — Canon U.S.A., Inc. IP Division

(57) ABSTRACT

A control unit is provided that is configured to execute predetermined control processing to prevent printing previously executed by a first printing unit from being executed by a second printing unit, the printing being based on at least one of one or more print jobs received from a server system.

20 Claims, 9 Drawing Sheets

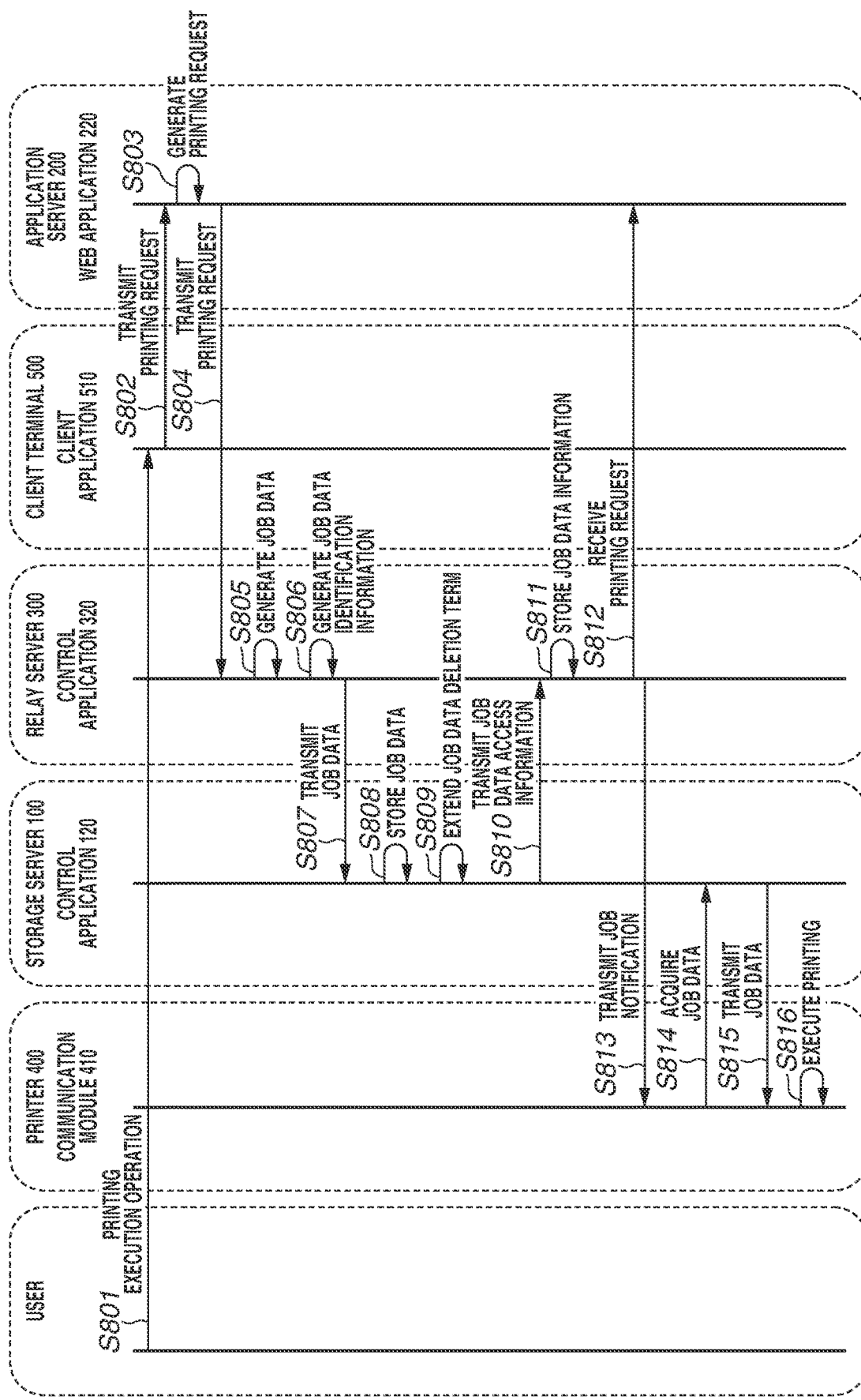

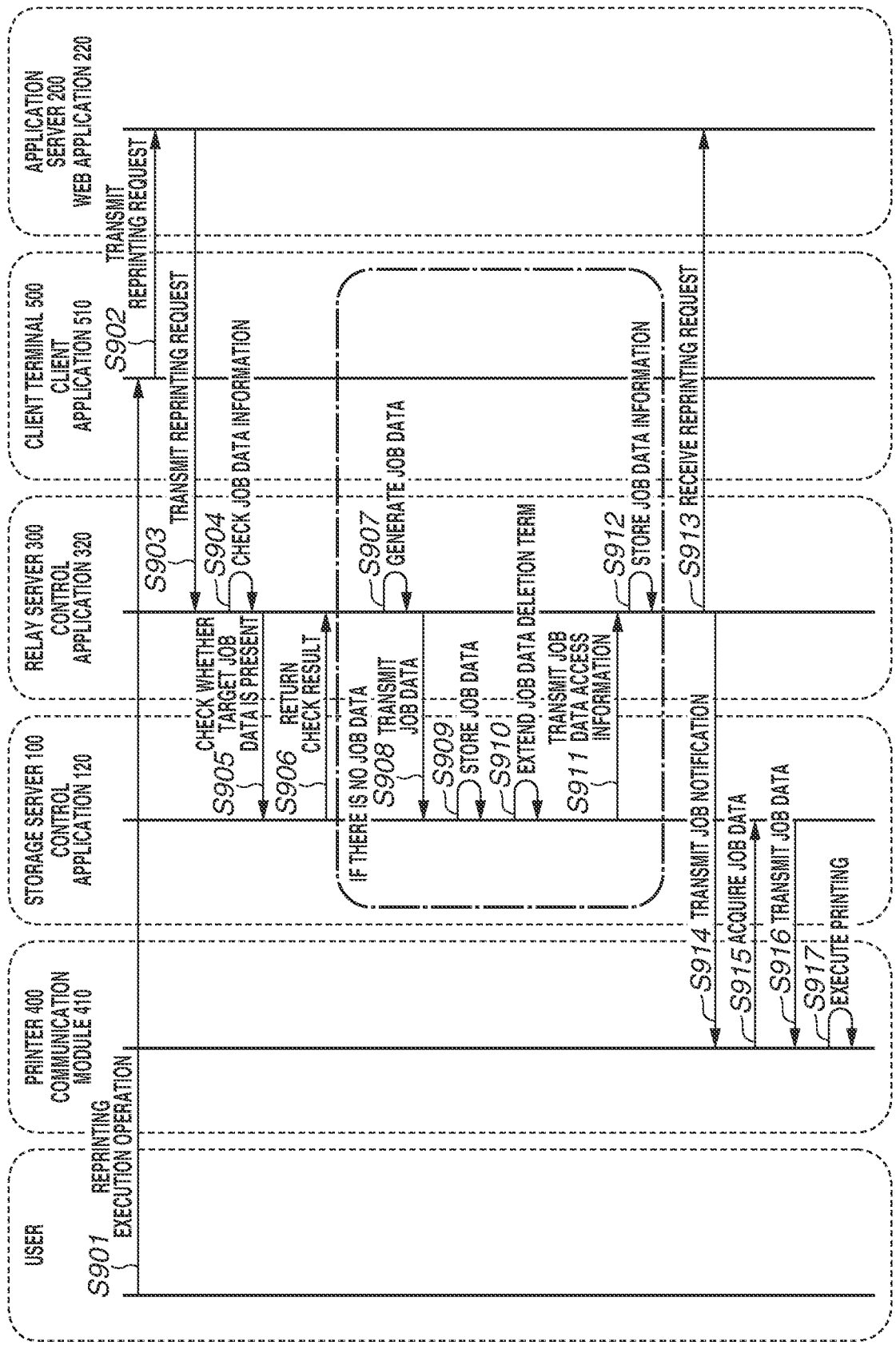

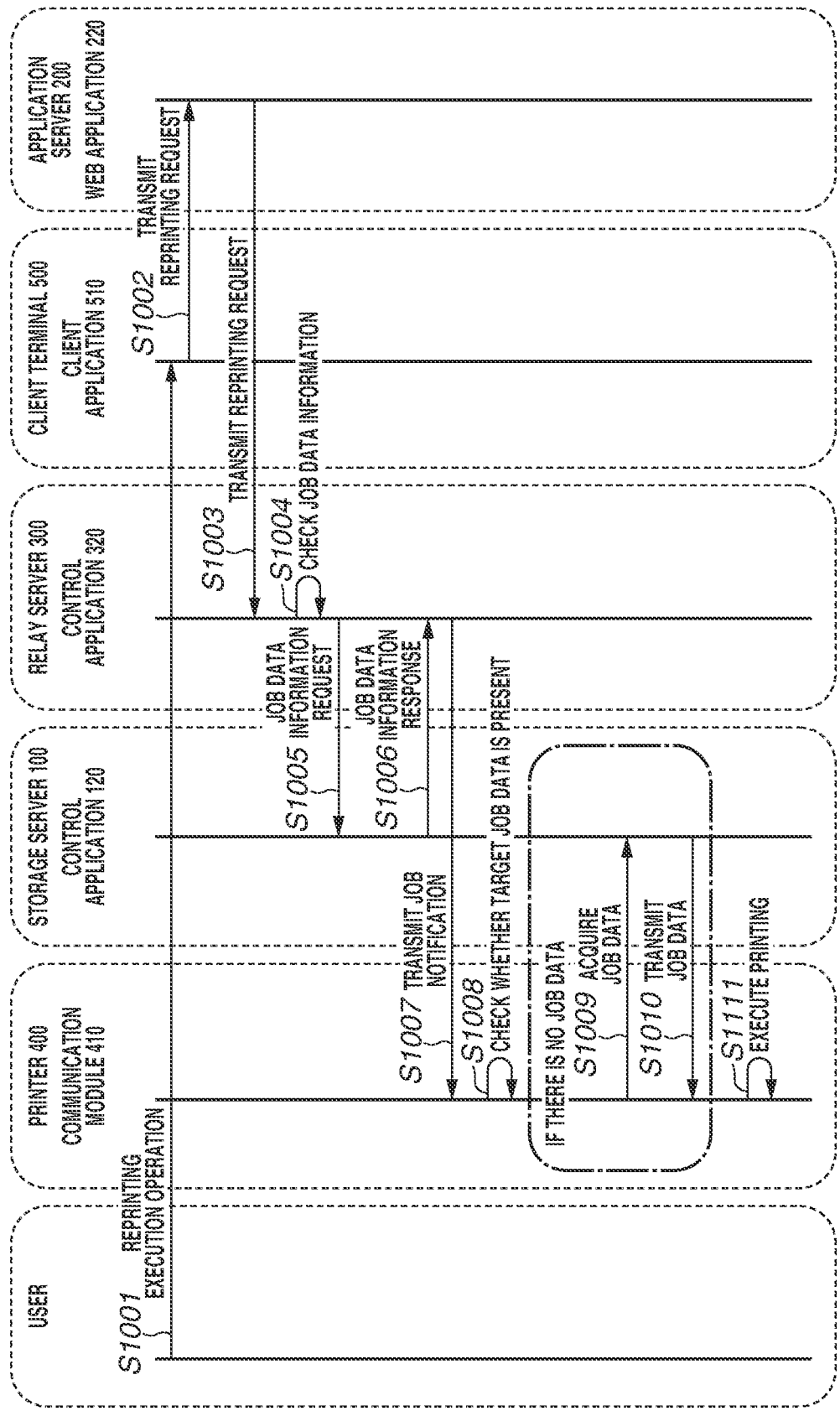

PRINTING SYSTEM, SERVER, CONTROL METHOD, AND STORAGE MEDIUM FOR CONTROLLING A PRINTER

BACKGROUND

Field of the Disclosure

The present disclosure relates to a printing system, a server, a control method, and a storage medium.

Description of the Related Art

There is known a system in which a server transmits a job to a printer and the printer executes printing based on the job received from the server (Japanese Patent Application Laid-Open No. 2014-153891).

SUMMARY

According to embodiments of the present disclosure, a printing system includes a server system, and a printer located outside the server system. The server system includes a transmission unit configured to transmit, to the printer, a print job to cause the printer to execute printing. The printer includes a reception unit configured to receive the print job from the server system, a first printing unit configured to cause a printing unit to execute printing based on the received print job, an acceptance unit configured to accept a re-execution instruction to re-execute printing previously executed by the first printing unit, a second printing unit configured to cause the printing unit to execute printing corresponding to the accepted re-execution instruction, and a control unit configured to execute predetermined control processing to prevent the printing previously executed by the first printing unit from being executed by the second printing unit, the printing being based on at least one of one or more print jobs received from the server system.

Further features of the present disclosure will become apparent from the following description of exemplary embodiments with reference to the attached drawings.

BRIEF DESCRIPTION OF THE DRAWINGS

FIG. 7 is a sequence diagram illustrating processing in which the user operates the client terminal to transmit a print job to the printer in a second exemplary embodiment.

FIG. 8 is a sequence diagram illustrating processing in which the user operates the client terminal to issue a reprinting instruction to the printer in the second exemplary embodiment.

FIG. 9 is a sequence diagram illustrating processing in which the user operates the client terminal to issue a reprinting instruction to the printer in a third exemplary embodiment.

DESCRIPTION OF THE EMBODIMENTS

With the recent popularization of systems in which a server system transmits a job to a printer and the printer executes printing based on the job received from the server system, there is an increasing demand for executing appropriate control processing on printing that has previously been executed in the system.

The present disclosure has been made in view of the above-described issue, and is directed to executing appropriate control processing on printing that has previously been executed in a system in which a printer executes printing based on a job received from a server system.

Exemplary embodiments of the present disclosure will be described in detail below with reference to the accompanying drawings. The following exemplary embodiments are not intended to limit the present disclosure. Not all of the combinations of the features described in the exemplary embodiments are used in a method of solving the issue in the present disclosure.

A first exemplary embodiment will be described. The first exemplary embodiment illustrates an example of a printing system including a client terminal (information processing apparatus) and at least one of a printer, an application server, a relay server, or a storage server.

First, a configuration example of the printing system will be described.

Figure 1:
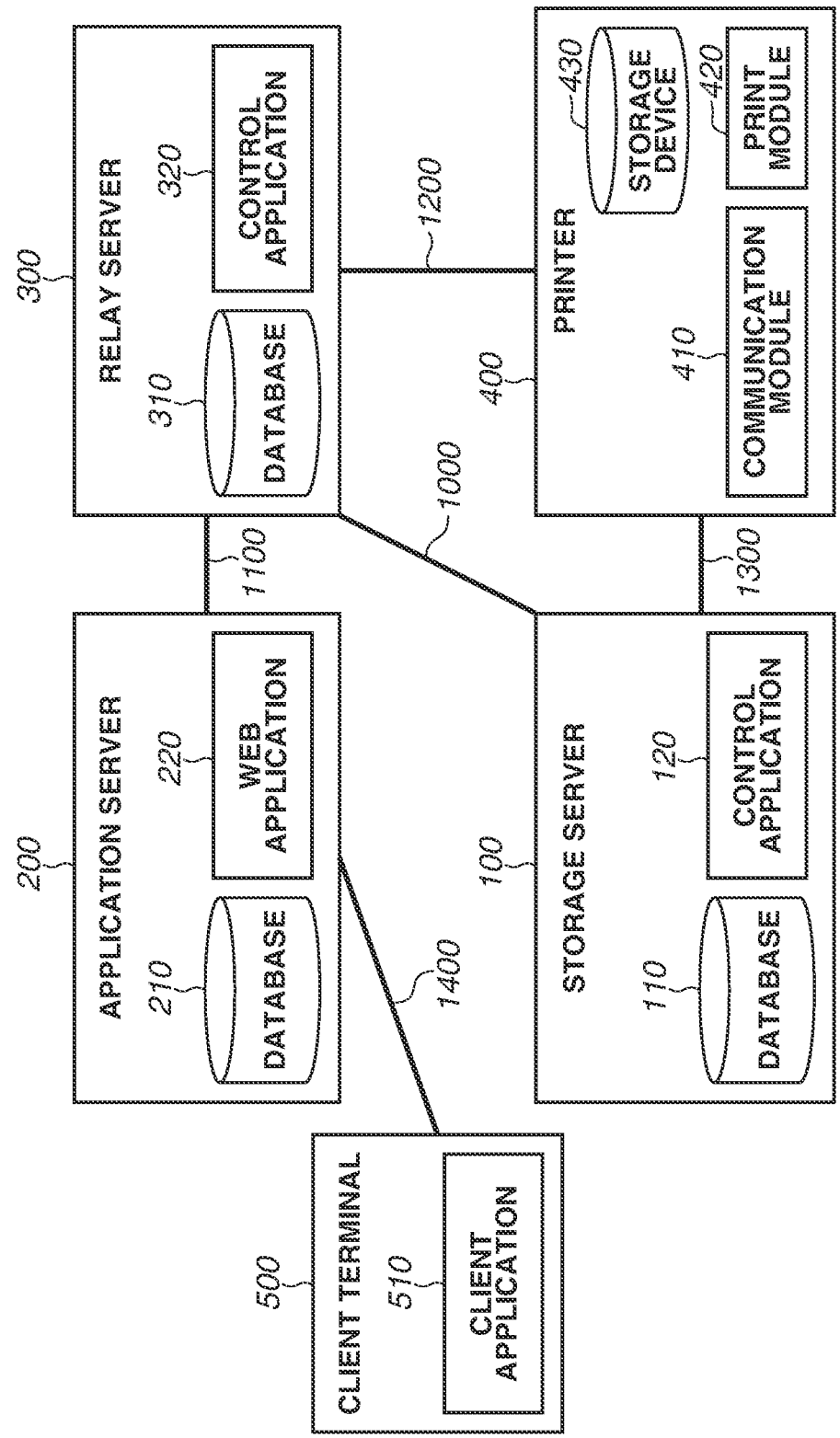
FIG. 1 is a block diagram illustrating a configuration example of a client-server network system according to a first exemplary embodiment.

FIG. 1 is a block diagram illustrating a configuration example of a client-server network system as the printing system according to the present exemplary embodiment.

The printing system illustrated in FIG. 1 includes a relay server 300 (first server), a storage server 100 (second server), an application server 200, a printer 400, and a client terminal 500. The relay server 300, the storage server 100, the application server 200, the printer 400, and the client terminal 500 are interconnected via networks 1000, 1100, 1200, 1300, and 1400, and thus can communicate with one another via the networks 1000, 1100, 1200, 1300, and 1400. The networks 1000, 1100, 1200, 1300, and 1400 are, for example, the Internet.

The configurations of the application server 200, the printer 400, and the client terminal 500 are not limited to the configuration example illustrated in FIG. 1. A plurality of application servers 200, a plurality of printers 400, and a plurality of client terminals 500 may be provided.

Examples of the networks 1000, 1100, 1200, 1300, and 1400 include a local area network (LAN), such as the Internet, a wide area network (WAN), a telephone line, a dedicated digital line, an asynchronous transfer mode (ATM), a frame relay line, a cable television line, a data broadcasting wireless line, and a so-called communication network implemented by a combination of these networks. Any network can be used as long as data can be transmitted and received.

Different or identical networks may be used as the networks 1000, 1100, 1200, 1300, and 1400.

A database 110 in the storage server 100 stores job data generated by the relay server 300. A control application 120 receives various requests transmitted from the relay server 300 via the network 1000, and processes the various requests.

A database 210 in the application server 200 stores various kinds of information to provide a user with a cloud printing service. A web application 220 issues a printing request to the relay server 300 via the network 1100. As described above, a plurality of application servers 200 may be provided. In this case, the application servers 200 may include different individual web applications 220, and may provide different individual services.

A database 310 in the relay server 300 stores information about the printer 400 to provide a notification about a print job. A control application 320 generates job data based on the printing request received from the application server 200, and transmits the generated job data to the storage server 100 via the network 1000. The control application 320 transmits a job notification to the printer 400 via the network 1200.

A communication module 410 in the printer 400 receives the job notification from the relay server 300 via the network 1200, and receives the job data from the storage server 100 via the network 1300 by using job data access information included in the job notification.

A print module 420 executes printing using the job data received by the communication module 410. A storage device 430 stores the job data.

A client application 510 is, for example, an application for communicating with the application server 200 via the network 1400 according to a user operation to provide a web application service to the user based on information received from the application server 200. A specific example of the client application 510 is a web browser.

While the above-described exemplary embodiment illustrates the configuration in which the storage server 100 and the relay server 300 are separate servers, the configurations of the storage server 100 and the relay server 300 are not limited to these configurations. For example, the storage server 100 and the relay server 300 may be included in one server.

It is assumed herein that the one server is a server system. A server system may be composed of a single information processing apparatus (a personal computer etc.), or may be composed of a plurality of information processing apparatuses that operate in cooperation. A combination of at least two from among the application server 200, the storage server 100, and the relay server 300 may be regarded as one server system.

Figure 2:
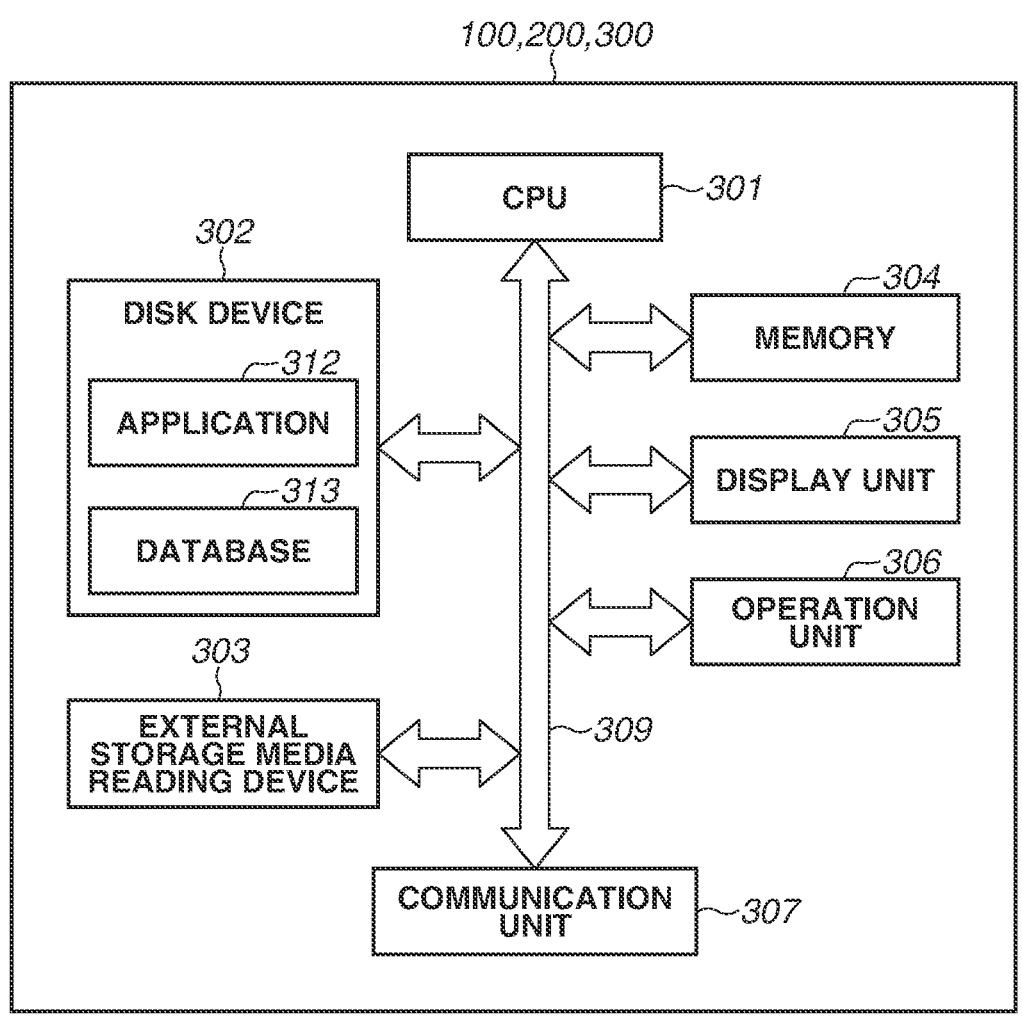
FIG. 2 is a block diagram illustrating a configuration example of a storage server, an application server, and a relay server.

FIG. 2 is a block diagram illustrating a schematic configuration example of the storage server 100, the application server 200, and the relay server 300.

A central processing unit (CPU) 301 is configured to control each unit described below. A disk device 302 stores an application program 312, a database 313, an operating system (OS), and various files to be read out by the CPU 301. An external storage media reading device 303 is a device for reading out information such as files stored in an external storage medium such as a secure digital (SD) card. A memory 304 is a random-access memory (RAM) or another type of memory. For example, the CPU 301 temporarily stores or buffers data in the memory 304 as appropriate. A display unit 305 includes a liquid crystal display (LCD) as an example, and displays various kinds of information. An operation unit 306 is composed of a keyboard, a mouse, and other devices for the user to perform various input operations. A network communication unit 307 is connected to a network, such as the Internet, and performs various communication operations. The communication unit 307 is compatible with a wired LAN or a wireless LAN. The above-described units are interconnected via a bus 309.

Processing for the control application 120 in the storage server 100, the web application 220 in the application server 200, and the control application 320 in the relay server 300 described below is implemented such that the CPU 301 reads out programs for processing and runs the programs.

Figure 3:
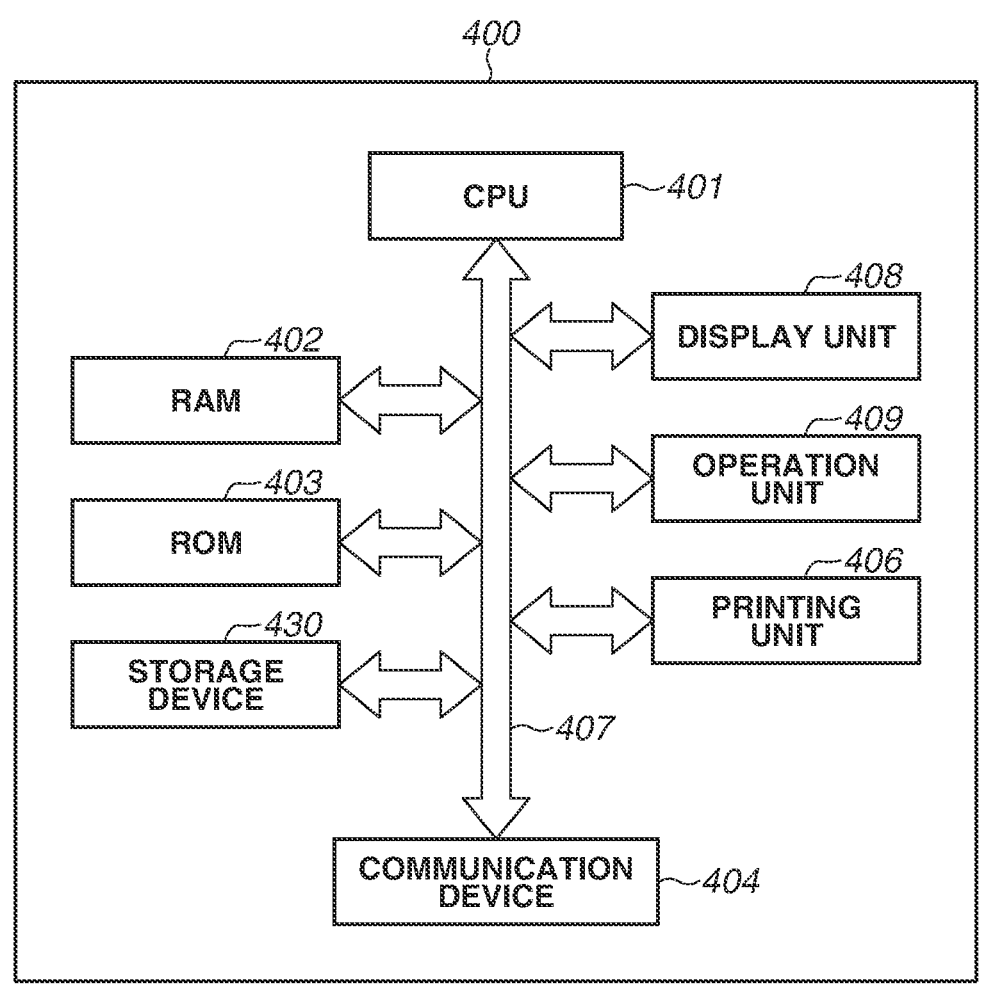
FIG. 3 is a block diagram illustrating a configuration example of a printer.

FIG. 3 is a block diagram illustrating a configuration example of the printer 400.

A CPU 401 calculates, determines, and controls data and instructions based on programs stored in a RAM 402 and a read-only memory (ROM) 403.

The RAM 402 is used as a temporary storage area for the CPU 401 to perform various types of processing.

The ROM 403 records an OS and other kinds of application software. The ROM 403 may be a data rewritable non-volatile memory as typified by a flash memory.

A communication device 404 is an interface connected with a LAN cable, and communicates data with the relay server 300 and the storage server 100 via routers (not illustrated) or the networks 1200 and 1300, respectively. This data communication may be established wirelessly via, for example, an interface compatible with wireless communication.

A display unit 408 includes a LCD by way of example, and displays various kinds of information. An operation unit 409 is composed of buttons, a touch panel, and other components for the user to perform various input operations.

A printing unit 406 processes the job data received by the communication device 404, and performs printing on a document sheet.

The storage device (storage unit) 430 stores the job data received by the communication device 404.

A system bus 407 exchanges data with the CPU 401, the RAM 402, the ROM 403, the communication device 404, the printing unit 406, the display unit 408, the operation unit 409, and other units.

Processing for the communication module 410 and the print module 420 in the printer 400 is implemented such that the CPU 401 reads out programs for processing and runs the programs.

Figure 4:
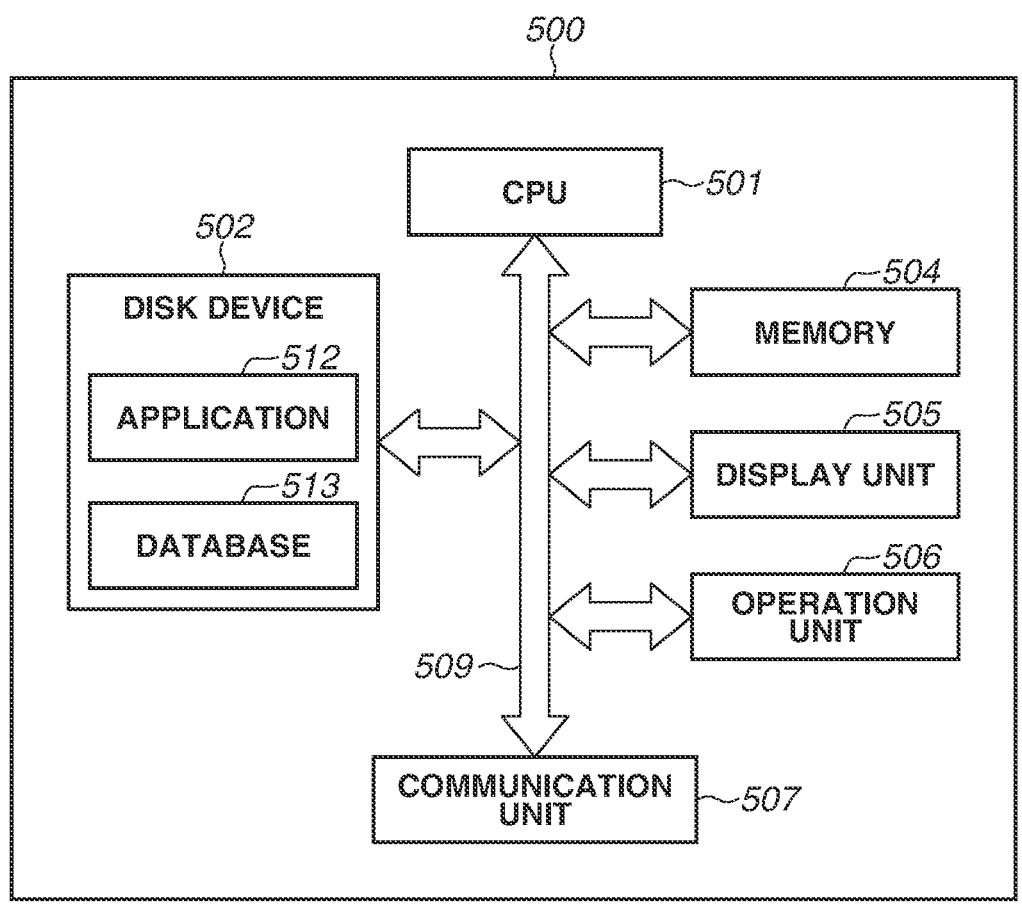
FIG. 4 is a block diagram illustrating a configuration example of a client terminal.

FIG. 4 is a block diagram illustrating a configuration example of the client terminal 500.

A CPU 501 is a central processing unit configured to control each unit described below. A disk device 502 stores an application program 512, a database 513, an OS, and various files to be read out by the CPU 501. A memory 504 is a RAM or another type of memory. For example, the CPU 501 temporarily stores or buffers data in the memory 504 as appropriate. A display unit 505 includes a LCD as an example, and displays various kinds of information. An operation unit 506 is composed of a keyboard, a mouse, a touch panel, and other components for the user to perform various input operations. A communication unit 507 is connected to a network such as the Internet, and performs various communication operations. The communication unit 507 is compatible with a wired LAN or a wireless LAN. The above-described units are interconnected via a bus 509. Processing for the client application 510 in the client terminal 500 illustrated in FIG. 1 is implemented such that the CPU 501 reads out programs for processing and runs the programs.

Figure 5:
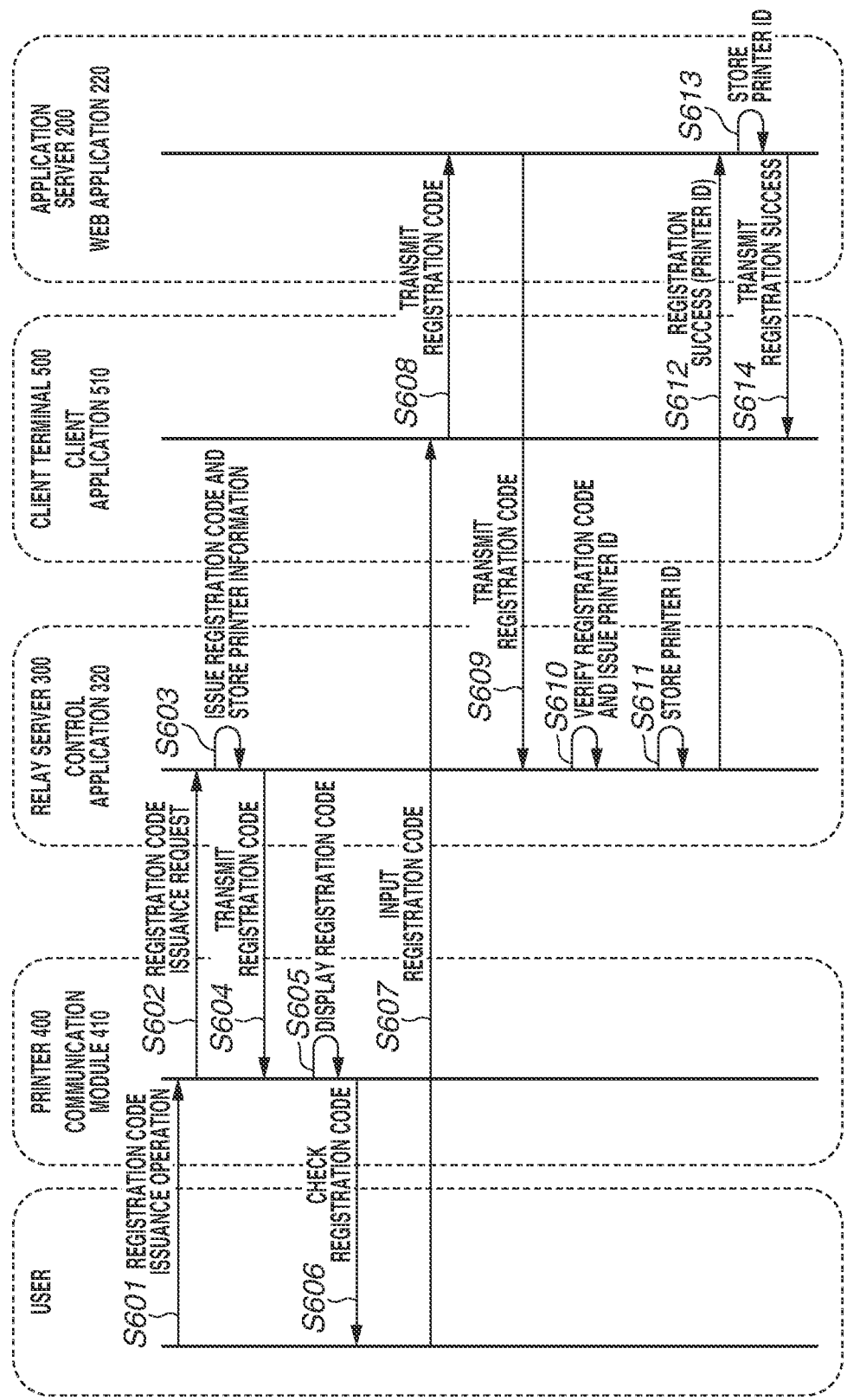
FIG. 5 is a sequence diagram illustrating processing of registering the printer in a web application provided by the application server in the first exemplary embodiment.

Next, processing in which the user operates the client terminal 500 to register the printer 400 in the web application 220 to be operated on the application server 200 so that the user can use services (operation in the present exemplary embodiment) provided in the configuration illustrated in FIG. 1. FIG. 5 is a sequence diagram illustrating processing of registering the printer 400 in the web application 220 in the application server 200. In step S601, the user operates the operation unit 409 in the printer 400 to perform a registration code issuance operation. A registration code is a one-time password to be issued at the relay server 300 so that the printer 400 to be registered by the user is associated with the web application 220. In step S602, the printer 400 that has received the operation sends printer information about the printer 400 and a registration code issuance request to the relay server 300 via the communication module 410. Examples of the printer information to be transmitted to the relay server 300 may include individual identification information, such as a serial number, model information, and function information about the printer 400, such as information indicating whether the printer 400 is provided with functions such as a scanner and a storage device. In step S603, the control application 320 in the relay server 300 that has received the registration code issuance request issues a registration code, associates the issued registration code with the received printer information, and stores the registration code and the printer information in the database 310. In step S604, the control application 320 transmits the issued registration code to the printer 400. In step S605, the printer 400 that has received the registration code displays the registration code on the display unit 408. In step S606, the user checks the registration code displayed on the display unit 408 of the printer 400. In step S607, the user inputs the registration code to the client application 510 in the client terminal 500. In step S608, the client application 510 in the client terminal 500 that has received the input transmits the registration code to the application server 200. In step S609, the web application 220 in the application server 200 transmits the received registration code to the relay server 300. In step S610, the relay server 300 in the control application 320 checks whether the received registration code matches the registration code issued in step S603. If the received registration code matches the registration code issued in step S603, in step S610, a printer identification (ID) to identify the printer 400 is issued. In step S611, the relay server 300 further stores the printer ID in association with the printer information stored with the registration code in the database 310. In step S612, the relay server 300 transmits the printer ID together with a registration success response to the application server 200. In step S613, the web application 220 associates the received printer ID with identification information about the client application 510 that has transmitted the registration code, and stores the printer ID and the identification information in the database 210. In step S614, the web application 220 transmits the registration success response to the client terminal 500.

The above-described processing enables the user to register the printer 400 to be used by the user in the web application 220 and to transmit a print job to the printer 400 by operating the client application 510 in the client terminal 500. The method of registering the printer 400 according to the present exemplary embodiment is merely an example. Any other method may be used as long as the application server 200 and the relay server 300 can associate the client application 510 and the specific printer 400 to be operated by the user and can store the client application 510 and the printer 400. In the processing of storing the printer ID and the printer information in the database 310 in step S611, the printer 400 acquires the information that is included in the printer information and indicates whether the printer 400 includes the storage device 430 in response to the registration code issuance request in step S602. However, the present disclosure is not limited to this configuration. For example, with information indicating whether the storage device 430 is included in each model preliminarily held in the database 310 in the relay server 300, the information may be acquired from model information included in the printer information and stored in the storage device 430.

Figure 6:
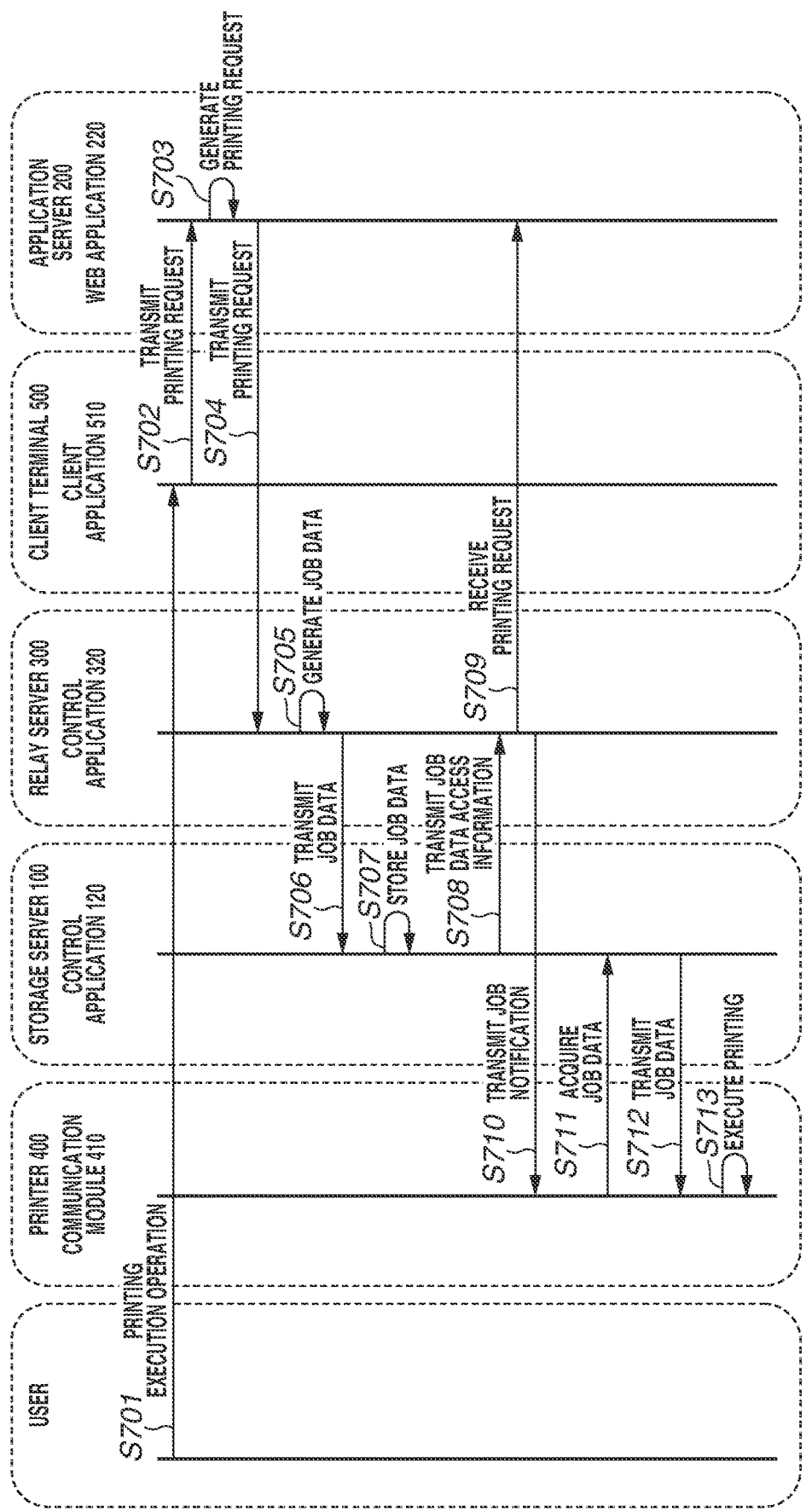
FIG. 6 is a sequence diagram illustrating processing in which a user operates the client terminal to transmit a print job to the printer in the first exemplary embodiment.

FIG. 6 is a sequence diagram illustrating processing in which the user operates the client terminal 500 to transmit a print job to the printer 400 via the application server 200 and the relay server 300.

In step S701, the user operates the client application 510 in the client terminal 500 to perform a printing execution operation on the printer 400 registered in the processing illustrated in FIG. 5. In step S702, the client application 510 that has received the printing execution operation transmits a printing request to the application server 200. In the present exemplary embodiment, the printing request includes a target image, document file data based on which printing is to be executed by the user, print settings, and job storage instruction information to instruct whether job data to be transmitted to the printer 400 is to be stored in the storage device 430 in the printer 400. The job storage instruction information enables the user to instruct whether to store the job data in the storage device 430 by operating the client application 510. As described below, in the present exemplary embodiment, control processing is performed to prevent the job data from being stored in the storage device 430 in the printer 400, regardless of whether the user has designated information to store the job data by a user operation on the client application 510. The job storage instruction information may not be included in the printing request without the issuance of the instruction indicating whether to store job data in the storage device 430 by a user operation on the client application 510 may be omitted. In step S703, the web application 220 in the application server 200 that has received the printing request generates the printing request using the received printing target file and print settings. In step S704, the web application 220 transmits the printing request to the relay server 300. This printing request may include various kinds of information included in the printing request transmitted from the client application 510 to the application server 200. In step S705, the control application 320 in the relay server 300 that has received the printing request generates job data for the printer 400 to execute printing processing based on the printing request. The job data includes print data that can be subjected to printing processing executed by the print module 420 in the printer 400, a print setting command to control a printing method, and a job storage instruction command to instruct whether to store the job data in the storage device 430. In the present exemplary embodiment, the job storage instruction command is controlled to instruct so that the job data will not be left stored in the printer 400 after printing (in other words, the job data is deleted from the printer 400 after printing) even when the job storage instruction information included in the printing request received by the relay server 300 from the application server 200 indicates a value indicating that the job data is to be stored. In other words, the job storage instruction command is a command for controlling printing based on the job data not to be executed as reprinting to be described below. To put it still another way, the job storage instruction command is a command for performing control processing to prevent printing based on the job data from being executed in the printer 400 again, without job data corresponding to the printing again received by the printer 400 from the storage server 100 after the printing is executed on the printer 400.

In step S706, the control application 320 further transmits the generated job data to the storage server 100. In step S707, the control application 120 in the storage server 100 that has received the job data stores the job data in the database 110. In this case, the control application 120 may include a function for automatically deleting job data in a lapse of a predetermined time to prevent a storage area in the database 110 of the storage server 100 from being occupied by an increasing amount of job data to be stored. To carry out the above-described job data automatic deletion function, the control application 120 also stores time information in storage of job data in the database 110. Examples of the time information may include information indicating the time when the control application 120 receives job data from the relay server 300, and information indicating the time when job data is deleted. After completion of storage of the job data, in step S708, the control application 120 transmits job data access information for the printer 400 to send a job data request to the storage server 100 and a job data storage complete response to the relay server 300. In step S709, the control application 320 in the relay server 300 transmits a printing request reception response to the application server 200. Next, in step S710, the control application 320 transmits a print job notification including the job data access information to the printer 400. In step S711, the communication module 410 in the printer 400 that has received the print job notification transmits the received job data access information to the storage server 100, and sends a request for the job data. In step S712, the control application 120 in the storage server 100 that has received the job data request checks the received job data access information, and transmits the job data to the printer 400. The printer 400 that has received the job data temporarily stores the job data in a memory (storage device) of the printer 400. The storage device 430 that stores reprinting job data may be as the memory that stores the job data before printing, or any other memory may be used. After that, in step S713, the communication module 410 in the printer 400 sends the job data to the print module 420, and the print module 420 executes printing based on the job data. In the present exemplary embodiment, the job data is deleted from the printer 400 after printing is completed. In other words, control processing is performed to prevent an option corresponding to the job data from being displayed in a reprinting list to be described below and to prevent reprinting based on the job data from being executed again based on an operation on the operation unit 409. Specifically, for example, if the storage device 430 is used as the memory that stores the job data before printing, the job data is deleted from the storage device 430. If a memory other than the storage device 430 is used as the memory that stores the job data before printing, the job data is deleted from the memory without transferring the job data to the storage device 430. After completion of printing based on the job data, the communication module 410 transmits information about the printing to the relay server 300. The relay server 300 that has received the information transmits the information to the application server 200. This configuration enables the relay server 300 and the application server 200 to manage information about printing executed by the printer 400 via communication with the relay server 300. The information about printing is, for example, information about at least one of the time when printing is completed, the number of sheets of recording media (such as paper) used for printing, or the amount of recording material (ink, toner, etc.) used for printing.

In the present exemplary embodiment, the use of job data stored in the storage device 430 enables reprinting without generating job data in the relay server 300 again. For example, a list of job data based on which printing has previously been executed and which is stored in the storage device 430 is displayed on the display unit 408, allowing the user to select an option corresponding to the job data based on which reprinting is to be executed to receive a reprinting instruction. In the present exemplary embodiment, the job data deleted from the printer 400 is not included in the list. Upon receiving the reprinting instruction (printing re-execution instruction), the print module 420 in the printer 400 acquires job data to be reprinted stored in the storage device 430 and executes printing. Printing that has previously been executed and is to be executed using job data stored in the storage device 430 without receiving job data again from the relay server 300 is referred to as reprinting. However, even in printing based on job data acquired via communication with the relay server 300, if the printing is not based on a printing instruction transmitted to the printer 400 via the relay server 300, but is based on a printing instruction issued by a user operation on the main body of the printer 400, information about the printing is not transmitted to the relay server 300. In addition, the information about the printing is not transmitted from the relay server 300 to the application server 200. This makes it difficult for the relay server 300 and the application server 200 to appropriately manage information based on printing based on the job data that has been executed in the printer 400 and is acquired via communication with the relay server 300. Thus, for example, if the web application 220 provides a service for determining a charging amount for the user depending on the number of printing sheets, or a service for counting the number of printing sheets and enabling the user to browse information about the counted number of printing sheets, it is difficult to appropriately execute such services.

To deal with the issues, in the present exemplary embodiment, control processing is performed to prevent the job data acquired by the printer 400 via communication with the relay server 300 from being stored in the storage device 430. With this configuration, the job storage instruction command for the job data is determined based on the value indicated by the job storage instruction information included in the printing request, the information indicating whether the printer 400 includes the storage device 430, and the characteristics of the web application 220 that has issued the printing request, thereby making it possible to appropriately determine the job storage instruction command even in a case where the job data is not to be stored in the storage device 430 in the printer 400 due to the characteristics of the services provided by the web application 220 with the configuration in which the printer 400 includes the storage device 430 and is configured to store the job data and execute reprinting.

Also, in the present exemplary embodiment, the printer 400 may store the job data acquired from the client terminal 500 without communicating with the relay server 300 in the storage device 430. The job data acquired without communicating with the relay server 300 is, for example, job data acquired by the printer 400 via wired communication or wireless communication with the client terminal 500 without involving the Internet. The job data may include the job storage instruction information. In other words, the printer 400 may control whether to store the job data acquired from the client terminal 500 without communicating with the relay server 300 in the storage device 430, depending on the content of the job storage instruction information included in the job data.

The printer 400 can execute printing (that is, reprinting described above) based on the job data stored as described above using the printing instruction issued in the printer 400 by operation on the main body of the printer 400.

In the configuration in which control processing is performed to prevent all job data acquired by the printer 400 via communication with the relay server 300 from being left stored in the memory of the printer 400 after printing as described above, any method other than the method of controlling the content of the job storage instruction command transmitted by the relay server 300 may be used. For example, in a configuration in which the job storage instruction command is not transmitted from the relay server 300 to the printer 400, the printer 400 may perform control processing on its determination to prevent the job data from being left stored in the memory of the printer 400 after printing based on information indicating that the job data acquired by the printer 400 is data acquired via communication with the relay server 300.

While the above-described exemplary embodiment illustrates the configuration in which control processing is performed to prevent all job data acquired by the printer 400 via communication with the relay server 300 from being left stored in the memory of the printer 400 after printing, the present disclosure is not limited to this configuration. Specifically, for example, control processing may be performed to prevent specific job data acquired by the printer 400 via communication with the relay server 300 from being left stored in the memory of the printer 400 after printing, and to enable reprinting to be executed based on job data that is different from the specific job data, is acquired by the printer 400 via communication with the relay server 300, and is stored in the memory of the printer 400 even after printing. Specifically, in this configuration, for example, if the storage device 430 is used as the memory that stores the job data before printing, the job data received from the storage device 430 is held in the storage device 430 without deleting the job data from the storage device 430. If the storage device 430 is not used as the memory that stores the job data before printing, the job data is transferred from the memory and stored in the storage device 430. The specific job data is, for example, job data based on the printing request transmitted to the specific application server 200 including the web application 220 that provides a service that has a function of managing information about printing. In other words, the specific job data is job data corresponding to the service that has the function of managing information about printing. Job data different from the specific job data is, for example, job data based on the printing request transmitted to the application server 200 that is different from the specific application server 200 and includes the web application 220 that provides a service without any function of managing information about printing. In this configuration, if the relay server 300 receives the printing request from the application server 200, the relay server 300 identifies the application server 200 from which the printing request is received. Further, the relay server 300 determines whether the identified application server 200 matches the specific application server 200. If it is determined that the identified application server 200 matches the specific application server 200, first control processing is performed to control the job storage instruction command to be transmitted to the printer 400, the job storage instruction command of which makes an instruction that the job data is not to be stored in the storage device 430. On the other hand, if it is determined that the identified application server 200 does not match the specific application server 200, second control processing is performed to control the job storage instruction command to be transmitted to the printer 400, the job storage instruction command of which makes an instruction that the job data is to be stored in the storage device 430. If the printer 400 receives the command that has an instruction that the job data is to be stored in the storage device 430, the printer 400 stores the job data in the storage device 430. In the determination as to which of the first control processing and the second control processing is to be performed, for example, capability information about the printer 400 may be referenced. For example, if it is determined that the printer 400 does not include the storage device 430 or have the reprinting function with reference to the capability information, the first control processing may be performed even when it is determined that the identified application server 200 does not match the specific application server 200. In the determination as to which of the first control and the second control is to be performed, for example, the job storage instruction information transmitted from the application server 200 may be referenced. For example, if the job storage instruction information does not indicate that the job data is to be stored in the storage device 430 of the printer 400, the first control processing may be performed even when it is determined that the identified application server 200 does not match the specific application server 200.

A second exemplary embodiment will be described. The first exemplary embodiment described above illustrates the configuration in which the instruction to prevent print data from being stored in the storage device 430 in the printer 400 is issued even when the printing request from the user indicates that the job data is to be stored due to the characteristics of the web application 220. In the second exemplary embodiment, when a reprinting request is received from the user, processing of regenerating job data is omitted by providing a notification about generated job data stored in the storage server 100 to the printer 400, which leads to a reduction in the time to provide the notification about job data to the printer 400 and a reduction in server resources of the relay server 300.

FIG. 7 is a sequence diagram illustrating processing in which the user operates the client terminal 500 to transmit a print job to the printer 400 via the application server 200 and the relay server 300 in the present exemplary embodiment.

Steps S801 to S805 are respectively identical to steps S701 to S705 in the sequence diagram of FIG. 6. In step S806, a job data identifier for uniquely designating a job in reprinting is generated. Next, in step S807, the control application 320 in the relay server 300 transmits job data, including an instruction to extend a job data automatic deletion term, to the storage server 100 in a case where the job storage instruction information included in the printing request received by the relay server 300 from the application server 200 indicates a value indicating that the job data is to be stored, in a case where there is no information as to whether the printer 400 does not include the storage device 430, stored in the database 310 in the relay server 300, and in a case where the job data is not to be stored in the storage device 430 in the printer 400 due to the characteristics of the web application 220 that has transmitted the printing request. In step S808, the control application 120 in the storage server 100 that has received the job data stores the job data in the database 110. If the instruction to extend the job data automatic deletion term is received from the relay server 300, in step S809, the control application 120 extends the automatic deletion term for the job data stored in step S807, or changes settings so as not to perform automatic deletion. Step S810 is identical to step S708. In step S811, the relay server 300 that has received the job data access information from the storage server 100 associates the job data identifier, the job data access information, the job storage instruction command for the generated job data, and the job storage instruction information included in the printing request, and stores the associated information in the database 310 so that the job data designated in reprinting can be acquired from the storage server 100. In step S812, the relay server 300 sends a printing request reception response to the application server 200. In this case, the relay server 300 transmits the response including the job data identifier for designating the job data in reprinting.

Steps S813 to S816 are identical to steps S710 to S713, respectively.

The above-described processing makes it possible to prevent the job data stored in the storage server 100 from being automatically deleted and to use the job data in reprinting when the printer 400 does not include the storage device 430 and when the job data is not to be left stored in the printer 400 after printing though the printer 400 includes the storage device 430, in a case where an instruction to store the job data to reprint is issued in the printing request from the user. If the job data storage instruction is issued in the printing request from the user in cases other than the above-described case, the job data is left stored in the printer 400 even after printing using the job storage instruction command for the job data and control processing is performed to enable reprinting, thereby making it possible to save the storage area of the database 110 in the storage server 100.

FIG. 8 is a sequence diagram illustrating processing in which the user operates the client terminal 500 to issue a reprinting instruction to the printer 400 via the application server 200 and the relay server 300 in the present exemplary embodiment.

In step S901, the user operates the client application 510 in the client terminal 500 to perform a reprinting execution operation for the print job on which printing has previously been executed in the processing illustrated in FIG. 7 on the printer 400 registered in the processing illustrated in FIG. 5. In step S902, the client application 510 that has received the reprinting execution operation transmits a reprinting request to the application server 200. In step S903, the web application 220 in the application server 200 that has received the reprinting request transmits the reprinting request to the relay server 300. In the present exemplary embodiment, the reprinting request includes a job data identifier for designating job data to be reprinted. In step S904, the control application 320 in the relay server 300 that has received the printing request acquires target job data information using the job data identifier from the database 310, and checks the job storage instruction command and the job storage instruction information that are associated with the acquired job data.

If the job storage instruction command for the acquired job data indicates a value indicating that the job data is not to be stored in the storage device 430 in the printer 400, and if the job storage instruction information indicates a value indicating that the job data is to be stored, in step S905, it is checked whether there is any job data in the storage server 100. In step S906, the control application 120 in the storage server 100 that has received the result of checking whether there is any job data checks whether the target job data is present, and returns the checking result.

If the job data has already been automatically deleted from the database 110 in the storage server 100 and the control application 320 receives the response indicating that there is no job data from the storage server 100 in step S906, in step S907, the control application 320 regenerates job data based on the job data information stored in the database 310. In steps S908, S909, S910, and S911, the control application 320 transmits the generated job data to the storage server 100 and acquires job data access information to provide a notification about the job data to the printer 400. The series of processing is identical to steps S807, S808, S809, and S810 illustrated in FIG. 7. Lastly, in step S912, the control application 320 updates the job data access information for the job data stored in the database 310 with the job data access information received from the storage server 100.

If there is any job data, it is determined that there is no need to regenerate job data, and the processing proceeds to the subsequent step.

In step S913, the control application 320 transmits a reprinting request reception response to the application server 200. Next, in step S914, the control application 320 transmits, to the printer 400, the job notification including the job data access information that is associated with the job data identifier and is stored in the database 310. Steps S915 to S917 are respectively identical to steps S814 to S816 illustrated in FIG. 7.

The above-described configuration makes it possible to reduce the time to start printing in the reprinting processing, while reducing the load on the server that generates job data, in reprinting processing on the print job previously executed by the user.

The above-described exemplary embodiment illustrates the configuration in which job data is regenerated in step S907, if the job data has already been deleted from the storage server 100. However, embodiments of the present disclosure can have the effects with a configuration in which the control application 320 in the relay server 300 sends a response indicating that reprinting is unsuccessful to the application server 200 without regenerating job data.

A third exemplary embodiment will be described. The second exemplary embodiment described above illustrates a configuration example where a job notification is provided to the printer 400 without regenerating job data when a reprinting instruction is received in the configuration in which an instruction to prevent the job data from being stored in the storage device 430 in the printer 400 is issued when the print request from the user indicates that the job data is to be stored due to the characteristics of the web application 220. In the third exemplary embodiment, when a reprinting request is issued from the user again via the web application 220 in reprinting processing in which the printing request is received from the web application 220 that can store job data in the storage device 430 in the printer 400, an instruction to perform reprinting using job data stored in the printer 400 is issued. This leads to a reduction in time to start printing and a reduction in server resources of the relay server 300.

FIG. 9 is a sequence diagram illustrating processing in which the user operates the client terminal 500 to transmit a reprinting job to the printer 400 via the application server 200 and the relay server 300 in the present exemplary embodiment.

Steps S1001 to S1006 illustrated in FIG. 9 are respectively identical to steps S901 to S906 illustrated in FIG. 8.

In the second exemplary embodiment, if the job storage instruction command for the information about the job data to be reprinted acquired by the control application 320 in step S904 indicates a value indicating that the job data is not to be stored in the printer 400 and if the job storage instruction information indicates a value indicating that the job data is to be stored, in steps S905 and S906, it is checked whether job data is present in the storage server 100. Although not illustrated in FIG. 9, if there is no job data, in steps S907 to S911, job data is regenerated. This is processing to be executed for steps S1008 to S1010 in a case where the job data stored in the storage device 430 in the printer 400 to be described below has already been deleted.

After that, in step S1007, the control application 320 in the relay server 300 transmits a job notification for reprinting to the printer 400. In this case, the job notification includes a command instructing to execute printing using the job data stored in the storage device 430 in the printer 400, in addition to the job data access information. In step S1008, the communication module 410 in the printer 400 that has received the job notification checks whether there is a job to be reprinted in the storage device 430. If there is job data in the storage device 430, in step S1110, the communication module 410 transmits the job data stored in the storage device 430 to the print module 420, and in step S1111, the print module 420 that has received the job data executes printing. If no job data is present in the storage device 430, in step S1009, the communication module 410 transmits a job data acquisition request to the storage server 100 using the job access information received in the job notification. In step S1010, the control application 120 in the storage server 100 that has received job data acquisition request checks the received job data access information and transmits the job data to the printer 400. In step S1111, the communication module 410 that has received the job data transmits the job data to the print module 420, and the print module 420 processes the job data and executes printing.

According to the above-described configuration, when the reprinting request is issued via the web application 220 again from the user in reprinting processing in which the printing request is received from the web application 220 that can store job data in the storage device 430 in the printer 400, the reprinting instruction is issued using job data stored in the printer 400, thereby making it possible to reduce the time to start printing and reduce server resources of the relay server 300.

The above-described exemplary embodiment illustrates processing for regenerating job data if there is no job data when it is checked whether there is any job data in steps S1005 and S1006 in the above-described configuration. However, with a configuration in which the above-described processing is not executed and the job notification including no job data access information is transmitted in step S1007, the present exemplary embodiment can have the effects in issuing the printing instruction using the job data stored in the storage device 430 in the printer 400. In this case, if the communication module 410 confirms that no job data is present in the storage device 430 in step S1008, the execution of printing is interrupted, and then the processing is terminated.

A fourth exemplary embodiment will be described. The above-described exemplary embodiments illustrate methods in which control processing is performed on the print module 420 to determine whether to store job data in the storage device 430 using the job storage instruction command. However, embodiments of the present disclosure can have similar effects by other methods. For example, also when the job storage instruction command indicates that the job data is not to be stored, the job data is stored in the printer 400 even after printing. Alternatively, control processing can be performed to prevent job data from being displayed when information about the job data based on which printing has previously been executed is displayed on the display unit 408, thereby preventing the user from executing reprinting using the operation unit 409. Embodiments of the present disclosure can also have similar effects with a configuration in which a printing instruction for job data that is not to be stored, the printing instruction of which is issued by the job storage instruction command, is not accepted when the user issues a reprinting instruction from the operation unit 409 with all job data information displayed on the display unit 408. As described above, control processing is performed such that the user can accept a reprinting instruction alone from the web application 220, and the job data stored in the storage device 430 is used in the reprinting instruction alone from the web application 220, thereby eliminating the need to store job data in the storage server 100 and the need for the printer 400 to perform processing of acquiring job data in the storage server 100, which makes it possible to save the storage capacity of the database 110 in the storage server 100 and to reduce the time until a printing start command in reprinting.

For example, a configuration may be employed in which the job storage instruction is not transmitted from the relay server 300. Specifically, for example, the printer 400 may determine whether to continuously hold the received job data without deleting the job data based on the type of the received job data and without using the job storage instruction command. In this configuration, for example, the printer 400 performs control processing to delete the job data from the printer 400 based on information indicating that the received job data is based on the job notification transmitted from the relay server 300 and that the job data is transmitted from the storage server 100. Further, for example, the printer 400 performs control processing to delete the job data from the printer 400 based on information indicating that the received job data is based on the printing request transmitted to the application server 200 different from the specific application server 200 and is based on the job notification transmitted from the relay server 300 and that the received job data is transmitted from the storage server 100.

A fifth exemplary embodiment will be described. An object of embodiments of the present disclosure can also be achieved by the following processing. That is, a recording medium recording a software program code for implementing the functions according to the above-described exemplary embodiments is supplied to a system or an apparatus, and a computer (or a CPU or a micro processing unit (MPU)) of the system or the apparatus reads out the program code stored in the recording medium and executes the program code. In this case, the program code read out from the storage medium implements the functions according to the above-described exemplary embodiments, and the storage medium storing the program code is one aspect of embodiments of the present disclosure.

Examples of the storage medium for supplying the program code include a flexible disk, a hard disk, an optical disk, a magneto-optical disk, a compact disc (CD)-ROM, a CD-recordable (R), a magnetic tape, a non-volatile memory card, a ROM, and a digital versatile disk (DVD).

The functions according to the above-described exemplary embodiments may be implemented by the processing in which the program code is read out and executed by the computer, or further by processing in which an OS or the like running on the computer performs some or all of the actual processing based on an instruction from the program code.

The functions according to the above-described exemplary embodiments may also be implemented by processing in which the program code read out from the storage medium is written into a memory included in a function extension unit connected to the computer or a function extension board disposed in the computer, and then a CPU or the like included in the function extension board or the function extension unit performs some or all of the actual processing based on an instruction from the program code.

The configurations according to an aspect of embodiments of the present disclosure make it possible to execute appropriate control processing on printing previously executed in a system in which a printer executes printing based on a job received from a server system.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-000970, filed Jan. 6, 2022, which is hereby incorporated by reference herein in its entirety.

What is claimed is:

1. A printing system comprising:
a server system; and
a printer located outside the server system,
wherein the server system includes:
first at least one processer; and
first at least one memory coupled to the first at least one processor and having stored thereon first instructions, which when executed by the first at least one processor, cause the first at least one processer to act as:
  a transmission unit configured to transmit, to the printer, a print job to cause the printer to execute printing,
  wherein the print job includes either an instruction to store the print job in the printer or an instruction to not store the print job,
  wherein the transmission unit transmits a re-execution instruction for the print job and deletes the print job,
wherein the printer includes:
second at least one processer; and
second at least one memory coupled to the second at least one processor and having stored thereon second instructions, which when executed by the second at least one processor, cause the second at least one processer to act as:
  a reception unit configured to receive the print job from the server system;
  a first printing unit configured to cause the printer to execute printing based on the received print job;
  an acceptance unit configured to accept the re-execution instruction to re-execute printing previously executed by the first printing unit;
  a second printing unit configured to cause the printer to execute printing corresponding to the accepted re-execution instruction; and
  a control unit configured to execute predetermined control processing to prevent the printing previously executed by the first printing unit from being executed by the second printing unit, the printing being based on at least one of one or more print jobs received from the server system,
  wherein, in a case where the print job includes the instruction to not store the print job, the control unit performs control to store the print job in the at least one memory of the printer and performs control so that the print job that has been executed by the first printing unit is not included in a list of print jobs that have been printed, the list being displayed on a display.

2. The printing system according to claim 1,
wherein the printer further includes a storage configured to store the one or more print jobs in a predetermined storage, and
wherein the re-execution instruction to be accepted is the re-execution instruction to re-execute printing based on at least one of the one or more print jobs stored in the predetermined storage.

3. The printing system according to claim 2,
wherein the printer further includes the display configured to display a list corresponding to the one or more print jobs stored in the predetermined storage on a predetermined display, and
wherein any one of the print jobs in the list is selected to accept the re-execution instruction to re-execute printing based on the selected print job.

4. The printing system according to claim 3, wherein the predetermined control processing is control processing to prevent an option corresponding to at least one of the one or more print jobs received from the server system from being displayed in the list.

5. The printing system according to claim 1, wherein the predetermined control processing is control processing to delete, from a predetermined storage in the printer, at least one of the one or more print jobs received from the server system.

6. The printing system according to claim 1, wherein control processing is performed to prevent all printing operations previously executed by the first printing unit from being executed by the second printing unit, the printing operations being based on the one or more print jobs received from the server system.

7. The printing system according to claim 1,
wherein control processing is performed to prevent printing operations previously executed by the first printing unit from being executed by the second printing unit, the printing being based on the one or more print jobs corresponding to a predetermined printing service, of the one or more print jobs received from the server system, and
wherein control processing is performed to enable printing previously executed by the first printing unit to be executed by the second printing unit, the printing being based on the one or more print jobs corresponding to a service other than the predetermined printing service, of the one or more print jobs received from the server system.

8. The printing system according to claim 7, wherein the predetermined printing service is a service including a function to manage information about printing based on the print job corresponding to the predetermined printing service executed on the printer.

9. The printing system according to claim 7, wherein the predetermined printing service is a service including a function to determine a charging amount for a user that uses the predetermined printing service according to printing based on the print job corresponding to the predetermined printing service executed in the printer.

10. The printing system according to claim 7, wherein the predetermined printing service is a service that enables a user that uses the predetermined printing service to browse information about printing based on the print job corresponding to the predetermined printing service executed in the printer.

11. The printing system according to claim 7, wherein the second instructions, when executed by the second at least one processor, cause the second at least one processer to further act as a transmission unit configured to transmit, to the server system, information about printing based on the one or more print jobs corresponding to the predetermined printing service in a case where printing based on the one or more print jobs corresponding to the predetermined printing service is executed.

12. The printing system according to claim 7, wherein information about printing based on the one or more print jobs corresponding to the predetermined printing service includes information about at least one of a recording medium or a recording material used in the printing based on the one or more print jobs corresponding to the predetermined printing service.

13. The printing system according to claim 1,
wherein the first instructions, when executed by the first at least one processor, cause the first at least one processer to further act as a second transmission unit configured to transmit a command to prevent printing previously executed by the first printing unit from being executed by the second printing unit, the printing being based on the one or more print jobs transmitted from the server system, and
wherein the predetermined control processing is executed based on reception of the command by the printer.

14. The printing system according to claim 1,
wherein the one or more print jobs are also received from an information processing apparatus that is located outside the server system and is located outside the printer, and
wherein control processing is performed to enable printing previously executed by the first printing unit to be executed according to the re-execution instruction, the printing being based on at least one of the one or more print jobs received from the information processing apparatus.

15. The printing system according to claim 1, wherein the one or more print jobs are received from the server system via the Internet.

16. The printing system according to claim 1,
wherein the second instructions, when executed by the second at least one processor, cause the second at least one processer to further act as a second reception unit configured to receive a notification about the print job, and
wherein the printer acquires the print job from the server system to receive the print job based on the reception of the notification.

17. The printing system according to claim 1,
wherein the server system further includes a first server and a second server,
wherein the first server transmits a notification about the print job to the printer, and
wherein the second server transmits the print job to the printer.

18. The printing system according to claim 1, wherein the server system includes one or more information processing apparatuses.

19. A printer comprising:
at least one processer; and
at least one memory coupled to the at least one processor and having stored thereon instructions, which when executed by the at least one processor, cause the at least one processer to act as:
a reception unit configured to receive a print job from a server system located outside the printer, wherein the print job includes either an instruction to store the print job in the printer or an instruction to not store the print job, and wherein the server system transmits a re-execution instruction for the print job and deletes the print job;
a first printing unit configured to cause the printer to execute printing based on the received print job;
an acceptance unit configured to accept the re-execution instruction to re-execute printing previously executed by the first printing unit;
a second printing unit configured to cause the printing unit printer to execute printing corresponding to the accepted re-execution instruction; and
a control unit configured to execute predetermined control processing to prevent printing previously executed by the first printing unit from being executed by the second printing unit, the printing being based on at least one of the one or more print jobs received from the server system,
wherein, in a case where the print job includes the instruction to not store the print job, the control unit performs control to store the print job in the at least one memory of the printer and performs control so that the print job that has been executed by the first printing unit is not included in a list of print jobs that have been printed, the list being displayed on a display.

20. A control method for a printer, the control method comprising:
receiving a print job from a server system located outside the printer, wherein the print job includes either an instruction to store the print job in the printer or an instruction to not store the print job, and wherein the server system transmits a re-execution instruction for the print job and deletes the print job;
executing, by the printer, printing based on the received print job in first printing;
accepting the re-execution instruction to re-execute printing previously executed by the printer;
executing, by the printer, printing corresponding to the accepted re-execution instruction in second printing; and
executing predetermined control processing to prevent printing previously executed in the first printing from being executed in the second printing, the printing being based on at least one of one or more print jobs received from the server system,
wherein, in a case where the print job includes the instruction to not store the print job, the predetermined control processing performs control to store the print job in the at least one memory of the printer and the predetermined control processing performs control so that the print job that has been executed by the printer is not included in a list of print jobs that have been printed, the list being displayed on a display.

* * * * *